United States Patent
Chinnan

(10) Patent No.: US 10,026,182 B1
(45) Date of Patent: Jul. 17, 2018

(54) LOW-POWER UNDERWATER DEPTH PROFILING USING MORPHOLOGICAL FILTERING

(71) Applicant: Lockheed Martin Corporation, Bethesda, MD (US)

(72) Inventor: Anil P. Chinnan, Mitchel Field, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 87 days.

(21) Appl. No.: 15/332,430

(22) Filed: Oct. 24, 2016

Related U.S. Application Data

(60) Provisional application No. 62/245,446, filed on Oct. 23, 2015.

(51) Int. Cl.
*G06K 9/00* (2006.01)
*G06T 7/00* (2017.01)
*H04B 1/02* (2006.01)

(52) U.S. Cl.
CPC .. *G06T 7/0051* (2013.01); *G06T 2207/20016* (2013.01); *G06T 2207/20024* (2013.01); *G06T 2207/20041* (2013.01)

(58) Field of Classification Search
USPC ........ 382/100, 103, 106–107, 134, 154–155, 382/162, 168, 173, 181, 232, 254, 260, 382/274–276, 286–291, 305, 312; 367/87, 138, 88, 7, 131
See application file for complete search history.

(56) References Cited

U.S. PATENT DOCUMENTS

| | | | |
|---|---|---|---|
| 5,699,318 A | 12/1997 | Fischer | |
| 5,812,494 A | 9/1998 | Medeiros | |
| 6,438,274 B1 | 8/2002 | Tokuyama et al. | |
| 6,449,215 B1 * | 9/2002 | Shell | G01S 7/6245 367/7 |
| 6,721,694 B1 | 4/2004 | Lambrecht et al. | |
| 6,842,401 B2 * | 1/2005 | Chiang | G01S 7/521 367/138 |
| 7,231,087 B2 | 6/2007 | Huber | |
| 7,355,924 B2 * | 4/2008 | Zimmerman | G01S 7/52003 367/131 |
| 7,587,088 B2 | 9/2009 | Beikirch et al. | |

(Continued)

OTHER PUBLICATIONS

Zhang, Wenbin et al., "Application of Adaptive Structure Element for Generalized Morphological Filtering in Vibration Signal Denoising," 3rd International Congress on Image and Signal Processing (CISP), Oct. 16-18, 2010, IEEE, pp. 3313-3317.

*Primary Examiner* — Seyed Azarian
(74) *Attorney, Agent, or Firm* — Withrow & Terranova, PLLC

(57) ABSTRACT

Mechanisms for generating a true depth profile of a body of water are disclosed. A depth profile tensor that identifies a depth at each of a plurality of locations of the body of water is accessed. The depth profile tensor identifies, for at least some locations of the plurality of locations, multiple depths. The depth profile tensor is converted to a binary potential depth image that depicts multiple potential depths for the at least some locations. The multiple potential depths are reduced, by a morphological filter process, to a single depth for the at least some locations to generate a binary depth image. The binary depth image is converted to the true depth profile.

17 Claims, 4 Drawing Sheets

(56) References Cited

U.S. PATENT DOCUMENTS

| | | | |
|---|---|---|---|
| 8,903,134 B2 * | 12/2014 | Abileah | G06K 9/0063 |
| | | | 382/103 |
| 8,908,958 B2 | 12/2014 | Kimmel et al. | |
| 9,030,914 B2 * | 5/2015 | Guigne | G01S 15/88 |
| | | | 367/87 |
| 2011/0123090 A1 | 5/2011 | Zerfass et al. | |
| 2014/0269191 A1 * | 9/2014 | Iverson | G01S 15/025 |
| | | | 367/88 |

\* cited by examiner

LOW-POWER UNDERWATER DEPTH PROFILING USING MORPHOLOGICAL FILTERING

RELATED APPLICATION

This application claims the benefit of U.S. Provisional Application No. 62/245,446, filed on Oct. 23, 2015, entitled "LOW-POWER UNDERWATER DEPTH PROFILING USING MULTIPLE-STAGE MORPHOLOGICAL FILTERING," the disclosure of which is hereby incorporated herein by reference in its entirety.

TECHNICAL FIELD

The embodiments relate generally to underwater depth profiling and, in particular, to low-power underwater depth profiling using morphological filtering.

BACKGROUND

Underwater depth profiles of underwater surfaces are often obtained using relatively high-power sonar signals that substantially exceed the power level of ambient noise. Such high-power sonar signals, however, have disadvantages. One such disadvantage is that high-power sonar signals are relatively easily detectable by other entities, and, under certain circumstances, it may be desirable to obtain an underwater depth profile in a manner that is not detectable by other entities. Another disadvantage is that high-power sonar signals may be harmful to aquatic life and may thus be undesirable, or even banned, in areas where aquatic life may be present.

The use of low-power sonar signals, such as sonar signals having a power level substantially equal to, or below, the power level of ambient noise, makes it difficult to distinguish between the actual sonar returns and the ambient noise, leading to inaccurate underwater depth profiles. Inaccurate underwater depth profiles can result in unexpected contact between vessels and underwater terrain or objects resulting in injuries and vessel damage.

SUMMARY

The embodiments relate to mechanisms for generating a true depth profile of a body of water using low-power sonar and morphological filtering algorithms. The embodiments facilitate clandestine and marine-life safe mechanisms for determining a depth profile of a body of water. The embodiments also facilitate the generation of imagery that depicts the depth profile of the body of water.

In one embodiment, a method for generating a true depth profile of a body of water is provided. A depth profile tensor that identifies a depth at each of a plurality of locations of the body of water is accessed. The depth profile tensor identifies multiple depths for at least some locations of the plurality of locations. The depth profile tensor is converted to a binary potential depth image that depicts multiple potential depths for the at least some locations. The multiple potential depths are reduced, by a morphological filter process, to a single depth for the at least some locations to generate a binary depth image. The binary depth image is converted to the true depth profile.

In another embodiment, a computing device configured to generate a true depth profile of a body of water is provided. The computing device includes a memory and a processor coupled to the memory. The processor is configured to access a depth profile tensor that identifies a depth at each of a plurality of locations of the body of water, the depth profile tensor identifying multiple depths for at least some locations of the plurality of locations. The processor is also configured to convert the depth profile tensor to a binary potential depth image that depicts multiple potential depths for the at least some locations. The processor is further configured to reduce, by a morphological filter process, the multiple potential depths to a single depth for the at least some locations to generate a binary depth image. The processor is further configured to convert the binary depth image to a true depth profile, and to store the true depth profile in a storage device.

In another embodiment, a computer program product for generating a true depth profile of a body of water is provided. The computer program product is stored on a non-transitory computer-readable storage medium and includes instructions configured to cause a processor to carry out steps including accessing a depth profile tensor that identifies a depth at each of a plurality of locations of the body of water. The depth profile tensor identifies multiple depths for at least some locations of the plurality of locations. The instructions are also configured to cause the processor to carry out the step of converting the depth profile tensor to a binary potential depth image that depicts multiple potential depths for the at least some locations. The instructions are further configured to cause the processor to carry out the steps of reducing, by a morphological filter process, the multiple potential depths to a single depth for the at least some locations to generate a binary depth image, and converting the binary depth image to a true depth profile.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first dimension" and "second dimension," and does not imply a priority, a type, an importance, or other attribute, unless otherwise stated herein.

The embodiments relate to mechanisms for generating a depth profile of a body of water using low-power sonar and morphological filtering algorithms. The embodiments facilitate clandestine and marine-life safe mechanisms for determining a depth profile of a body of water. The embodiments also facilitate the generation of imagery that depicts the depth profile of the body of water.

Figure 1:
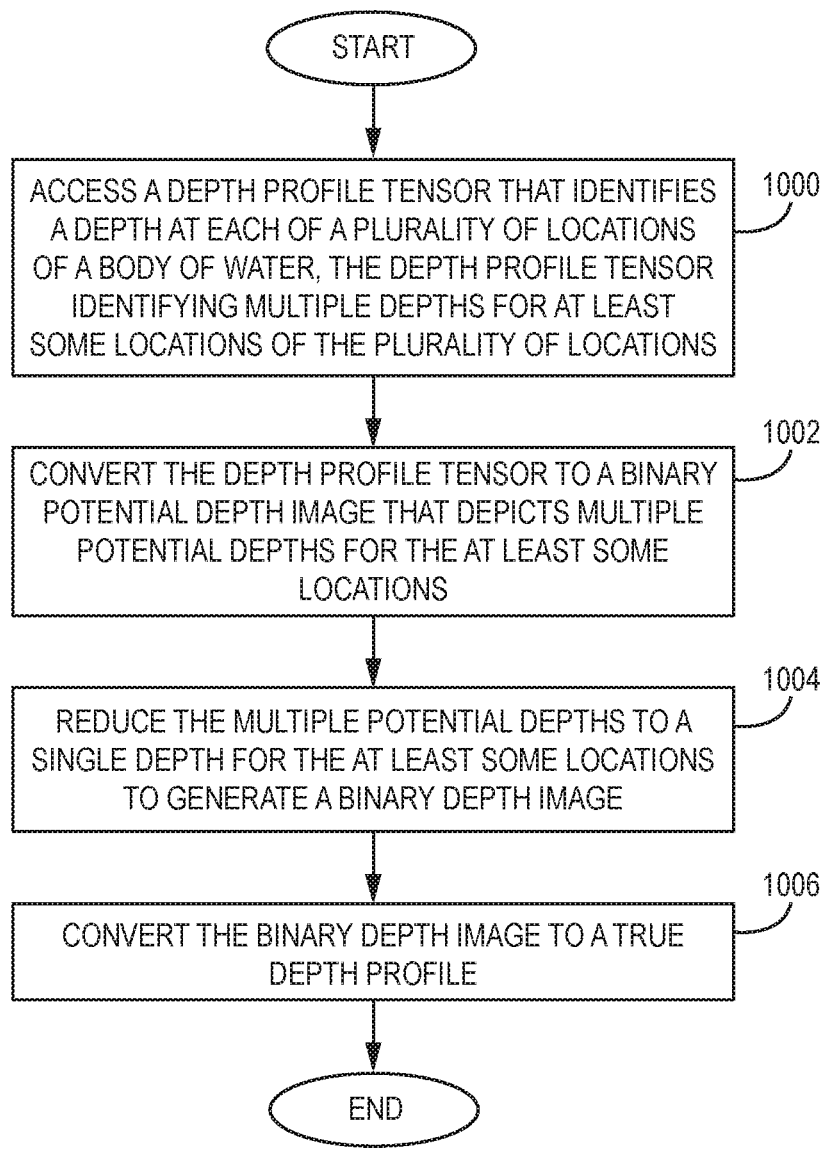
FIG. 1 is a flowchart illustrating a method for generating a true depth profile of a body of water according to one embodiment.

FIG. 1 is a flowchart illustrating a method for generating a true depth profile (hereinafter, "depth profile") of a body of water according to one embodiment. A depth profile tensor generated using low-power sonar is accessed that identifies a depth at each of a plurality of locations of the body of water (FIG. 1, block 1000). Because the depth profile tensor was generated using low-power sonar, the depth profile tensor identifies multiple depths for at least some locations of the plurality of locations. The identification of multiple depths for a single location may occur because the use of low-power sonar makes it difficult, or impossible, to distinguish the actual sonar return from false returns detected due to ambient noise. The power level of low-power sonar is substantially the same as the power level of ambient noise in the operating environment, thus implying a return signal-to-noise ratio that can approach unity and still be detectable.

The depth profile tensor may be any number of orders (sometimes referred to as dimensions). Each dimension comprises certain information. For example, one dimension may identify an "X" location with respect to the body of water; another dimension may identify a "Y" location with respect to the body of water; another dimension may identify potential depths at such locations; another dimension may identify a date and/or time such information was obtained; and the like. The depth profile tensor is converted to a binary potential depth image that depicts multiple potential depths for the at least some locations (FIG. 1, block 1002). A morphological filter process reduces the multiple potential depths to a single depth for the at least some locations to generate a binary depth image (FIG. 1, block 1004). This process may be repeated for each depth profile tensor. The binary depth image is then converted to a true depth profile (FIG. 1, block 1006).

Figure 2:
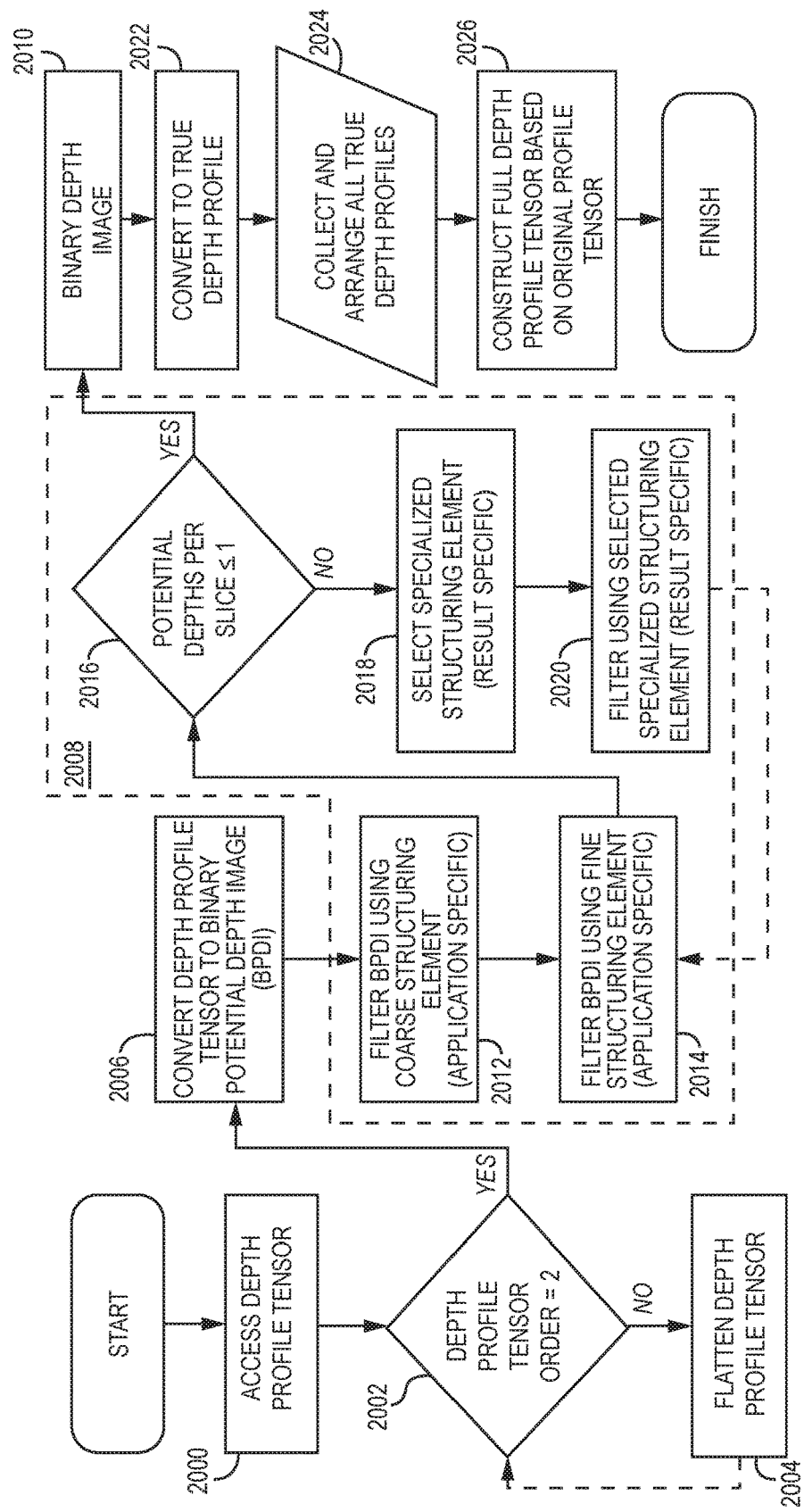
FIG. 2 is a flowchart illustrating a method for generating a true depth profile of a body of water in greater detail than that illustrated in FIG. 1 according to one embodiment.

FIG. 2 is a flowchart illustrating a method for generating a true depth profile of a body of water in greater detail than that illustrated in FIG. 1 according to one embodiment. A depth profile tensor generated using low-power sonar is accessed that identifies a depth at each of a plurality of locations of the body of water (FIG. 2, block 2000). In one embodiment, if the depth profile tensor comprises more than two orders, the depth profile tensor is converted (sometimes referred to as flattened, or reduced) to a second-order depth profile tensor, wherein one dimension identifies a plurality of successive locations in the body of water in a particular direction, and a second dimension comprises one or more potential depths for each of the successive locations (FIG. 2, blocks 2002-2004). The particular resolution of the second-order depth profile tensor is stored and maintained. By way of non-limiting example, the locations identified in the first dimension of the second-order depth profile tensor may be a linear succession of areas of the body of water that are 1 meter by 1 meter; 1 foot by 1 foot; or 2 meters by 2 meters. The second dimension depths may be in units of feet, meters, or any other desired distance. The second-order depth profile tensor corresponds to a sweep, at the corresponding resolution, across the bottom of the body of water in a particular direction. Thus, the flattening process may result in the generation of hundreds, thousands, or millions of such second-order depth profile tensors, each of which may be processed as discussed herein in order to generate a comprehensive binary depth image of the desired area of the body of water. Thus, while the process herein will be described with respect to one second-order depth profile tensor, it will be appreciated that the same process may be performed for each second-order depth profile tensor.

The second-order depth profile tensor is converted to a binary potential depth image that depicts multiple potential depths for at least some locations (FIG. 2, block 2006). Specifically, the binary potential depth image depicts a series of successive locations in the body of water based on the first dimension and depicts one or more depths for such series of successive locations based on the second dimension. Mechanisms for converting a second-order depth profile tensor to a binary potential depth image are discussed with regard to FIG. 3.

In one embodiment, the multiple potential depths are reduced, by at least one morphological filter process, to a single depth for the at least some locations to generate a binary depth image (FIG. 2, blocks 2008, 2010). In one embodiment, the binary potential depth image is first processed by a coarse morphological filter process using a coarse structuring element that eliminates at least some of the multiple potential depths at the same locations (FIG. 2, block 2012). The coarse structuring element may comprise any suitable structuring element utilized by a coarse morphological filter process, such as a 3-row-by-3-column pixel structuring element centered around the potential depth being evaluated, which will eliminate the potential depth if, and only if, there are no potential depths in either or both the pixel columns to the left and right of the potential depth in question. Another non-limiting example of a coarse morphological filter process is a 5-row-by-5-column pixel structuring element centered around the potential depth being evaluated, which will eliminate the potential depth if, and only if, there are no potential depths in at least 2 of the 4 pixel columns to the left and right of the potential depth in question, or the like. Other coarse structuring elements operate solely based on locations identified in the same binary potential depth image that is being processed.

The morphological filter process also includes reducing, by a fine morphological filter process using a fine structuring element, at least some remaining multiple potential depths for the at least some locations (FIG. 2, block 2014). The fine structuring element may comprise any suitable structuring element utilized by a fine morphological filter process, such as a 3-row-by-5-column pixel structuring element centered around the potential depth being evaluated, which will eliminate the potential depth if, and only if, there are no potential depths in at least 2 of the 4 pixel columns to the left and right of the potential depth in question. Another non-limiting example of a fine morphological filter process is a 5-row-by-9-column pixel structuring element centered around the potential depth being evaluated, which will eliminate the potential depth if, and only if, there are no potential depths in at least 2 of the 8 pixel columns to the left and right of the potential depth in question, or the like. Other fine structuring elements operate solely based on locations identified in the same binary potential depth image that is being processed.

After the fine morphological filter process is completed, it is determined whether any slice of the binary potential depth image comprises more than one depth (FIG. 2, block 2016). A "slice" refers to a particular location and the set of depths identified at that particular location. The binary potential depth image comprises a same number of slices as the number of locations identified in the second-order tensor from which the binary potential depth image was generated. If any slice contains more than one depth, then a specialized structuring element is selected (FIG. 2, block 2018). The specialized structuring element comprises one or more criteria for reducing the multiple depths to a single depth. The particular criteria may vary per application. By way of non-limiting example, the criteria may be the shallowest depth of the plurality of depths, the deepest depth of the plurality of depths, the collection of depths among the plurality of depths that results in the largest average slope for the final depth profile, the collection of depths among the plurality of depths that results in the smallest average slope for the final depth profile, a depth that results in a smallest change in slope from depths identified in adjacent locations, or the like.

The binary potential depth image is then filtered utilizing the selected specialized structuring element (FIG. 2, block 2020). The binary potential depth image is then processed, again, by the fine morphological filter process using the fine structuring element (FIG. 2, block 2014). This process may be repeated until each slice of the binary potential depth image comprises one or fewer depths (FIG. 2, blocks 2014-2020).

This process results in the generation of a binary depth image, wherein each slice location comprises one or fewer depths (FIG. 2, block 2010). The binary depth image is then converted to a true depth profile (FIG. 2, block 2022). The true depth profile is a second-order tensor that identifies one or fewer depths for each location. As discussed above, the process was described for a single second-order depth profile tensor but is repeated for a number of second-order depth profile tensors sufficient to describe depths at the particular area of the body of water. Each iteration generates a true depth profile at the respective granularity/resolution at which the corresponding binary potential depth image was generated at block 2006. When complete, all the true depth profiles are accumulated and arranged together (FIG. 2, block 2024). The true depth profiles are then used to construct a full depth profile tensor based on the original profile tensor (FIG. 2, block 2026). For example, if the original profile tensor is a fourth-order depth profile tensor containing information about a rectangular area that is X feet by Y feet with depths of Z feet at time T, and if the original profile tensor is "flattened" into 10 separate second-order depth profile tensors in the Y direction, then the 10 individual second-order depth profile tensors are reconstructed based on the original profile tensor in the same Y direction to create the full fourth-order depth profile tensor. The full fourth-order depth profile tensor may then be used in any number of different applications, such as the generation of imagery to depict the depth of the body of water.

Figure 3:
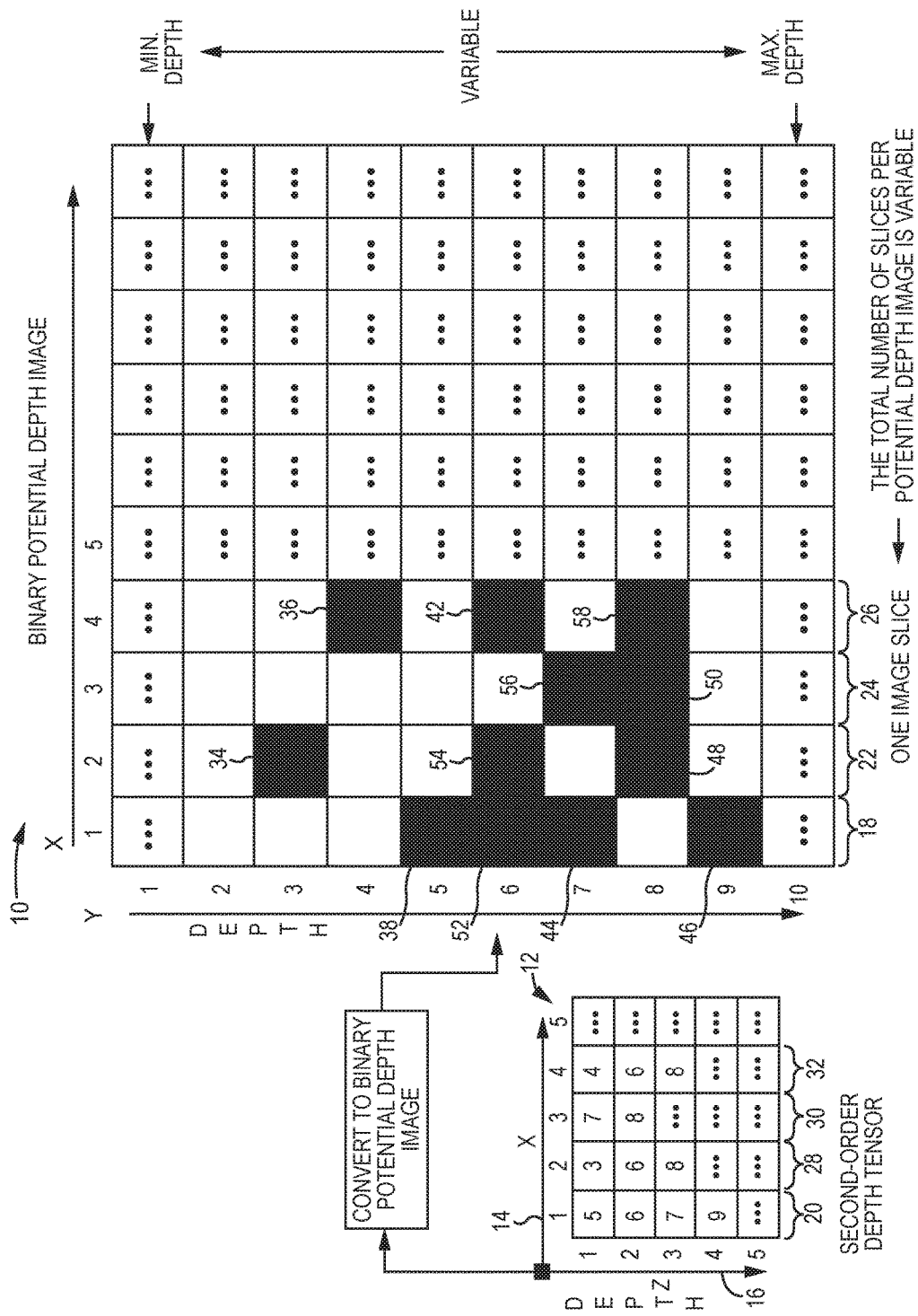
FIG. 3 is a diagram illustrating an example binary potential depth image according to one embodiment.

FIG. 3 is a diagram illustrating an example binary potential depth image 10 according to one embodiment. The binary potential depth image 10 is based on an example second-order depth tensor 12. The second-order depth tensor 12 has an X axis 14, wherein each column of the second-order depth tensor 12 represents a location of a certain size of the body of water, such as 1 foot by 1 foot, or 1 meter by 1 meter. The second-order depth tensor 12 has a Z axis 16, wherein each row in a column of the second-order depth tensor 12 identifies a potential depth at the respective location associated with the column. The potential depths were identified based on returns detected by a low-power sonar transmitter.

The binary potential depth image 10 is generated based on the second-order depth tensor 12. First, a minimum depth and a maximum depth may be determined based on one or more of the data contained in the second-order depth tensor 12, estimates, existing depth charts, assumptions, or the like. Solely for purposes of illustration, assume that the second-order depth tensor 12 has a resolution of 1 foot by 1 foot, that the minimum depth is identified as 1 foot, and that the maximum depth is identified as 10 feet. A slice 18 of the binary potential depth image 10 is generated based on a column 20 of the second-order depth tensor 12. Specifically, the slice 18 represents potential depths at 5-7 feet and at 9 feet based on the column 20 of the second-order depth tensor 12. Slices 22, 24, and 26 are similarly generated based on respective columns 28, 30, and 32 of the second-order depth tensor 12.

The binary potential depth image 10, once constructed, can then be processed by the morphological filter process (FIG. 2, block 2008). As an example, the coarse morphological filter process (FIG. 2, block 2012) may determine that outlier depths 34, 36 should be removed from the binary potential depth image 10, thereby reducing the potential three different depths of slice 22 to two potential depths, and the potential three different depths of slice 26 to two potential depths. The fine morphological filter process (FIG. 2, block 2014) may determine, based on an analysis of the slices 18, 22, 24, and 26, that one or more additional depths 38 and 42 depicted in the binary potential depth image 10 should be removed. A specialized structuring element (FIG. 2, blocks 2018, 2020) comprising a criterion of a shallowest depth may be selected, and the depths 44, 46, 48, and 50 may be removed. After the morphological filter process (FIG. 2, block 2008) completes, the binary potential depth image 10 may contain depths 52, 54, 56, and 58. As discussed above, the morphological filter process (FIG. 2, block 2008) is repeated until each slice in the binary potential depth image 10 contains one or fewer potential depths, resulting in a binary depth image. The binary depth image is then converted to a true depth profile.

Figure 4:
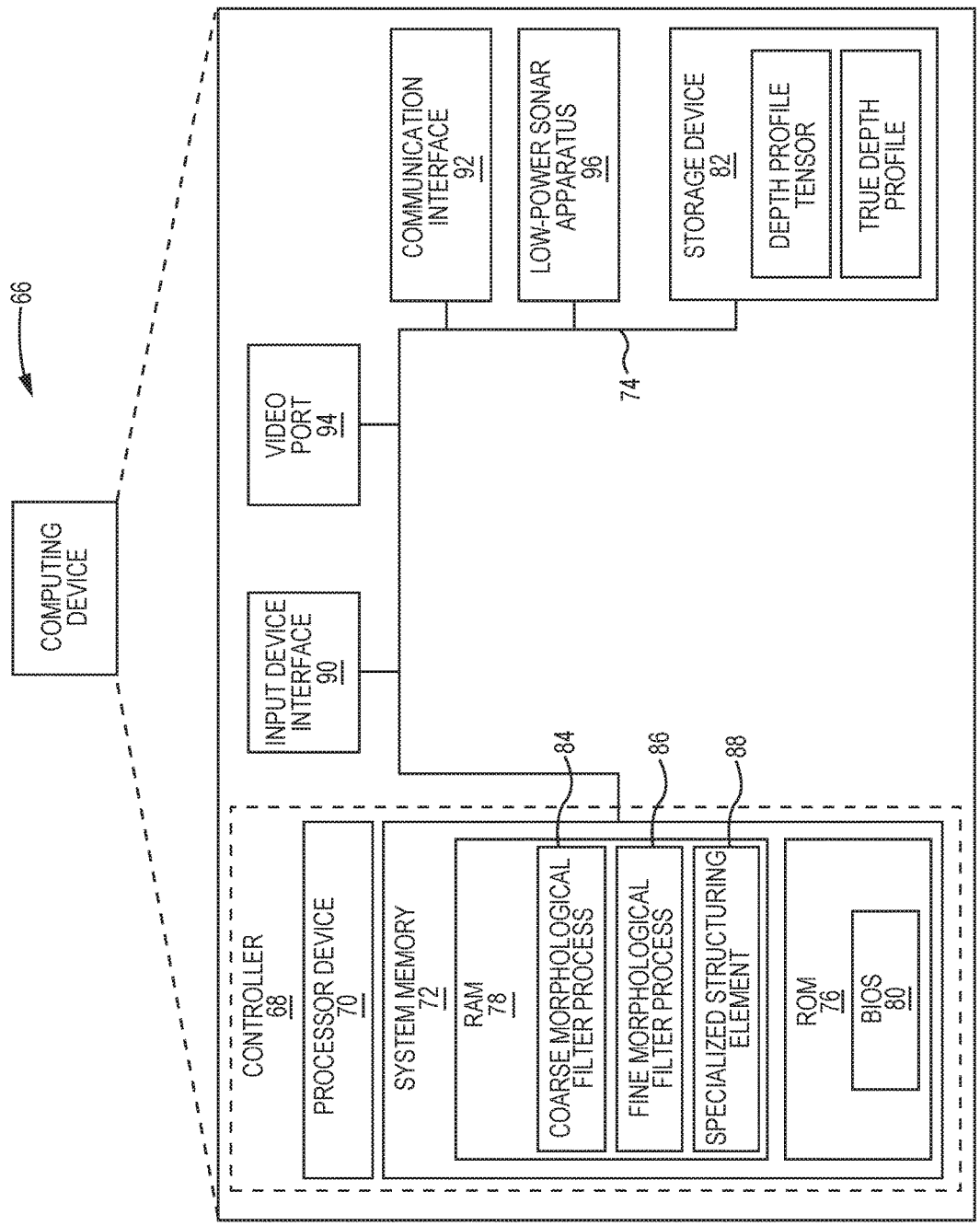
FIG. 4 is a block diagram of a computing device according to one embodiment.

FIG. 4 is a block diagram of a computing device 66 configured to generate a true depth profile of a body of water according to one embodiment. The computing device 66 may comprise any computing or processing device capable of including firmware, hardware, and/or executing software instructions to implement the functionality described herein, such as a desktop or laptop computer, a specialized computer dedicated to implementing the functionality described herein, or the like. The computing device 66 includes a controller 68 that includes a processor device 70 and a system memory 72. A system bus 74 provides an interface for system components including, but not limited to, the system memory 72 and the processor device 70. The processor device 70 can be any commercially available or proprietary processor.

The system bus 74 may be any of several types of bus structures that may further interconnect to a memory bus (with or without a memory controller), a peripheral bus, and/or a local bus using any of a variety of commercially available bus architectures. The system memory 72 may include non-volatile memory 76 (e.g., read-only memory (ROM), erasable programmable read-only memory (EPROM), electrically erasable programmable read-only memory (EEPROM), etc.) and/or volatile memory 78 (e.g., random-access memory (RAM)). A basic input/output system (BIOS) 80 may be stored in the non-volatile memory 76, and can include the basic routines that help to transfer information between elements within the computing device 66. The volatile memory 78 may also include high-speed RAM, such as static RAM, for caching data.

The computing device 66 may further include or be coupled to a computer-readable storage device 82, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage device 82 and other drives associated with computer-readable media and computer-usable media may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing functionality described herein.

A number of modules can be stored in the computer-readable storage device 82 and in the volatile memory 78, including a coarse morphological filter process 84, a fine morphological filter process 86, and a specialized structuring element 88, and other functions and/or modules suitable for implementing the functionality described herein.

All or a portion of the embodiments may be implemented as a computer program product stored on a transitory or non-transitory computer-usable or computer-readable storage medium, such as the computer-readable storage device 82, which includes complex programming instructions, such as complex computer-readable program code, configured to cause the processor device 70 to carry out the steps described herein. Thus, the computer-readable program code can comprise software instructions for implementing the functionality of the embodiments described herein when executed on the processor device 70. The processor device 70, in conjunction with the program modules in the volatile memory 78, may serve as the controller 68 for the computing device 66 that is configured to, or adapted to, implement the functionality described herein.

An operator may also be able to enter one or more configuration commands through a keyboard (not illustrated), a pointing device such as a mouse (not illustrated), or a touch-sensitive surface (not illustrated). Such input devices may be connected to the processor device 70 through an input device interface 90 that is coupled to the system bus 74, but can also be connected by other interfaces such as a parallel port, an Institute of Electrical and Electronic Engineers (IEEE) 1394 serial port, a Universal Serial Bus (USB) port, an IR interface, and the like.

The computing device 66 may also include a communication interface 92, suitable for communicating with a network as appropriate or desired. The computing device 66 may also include a video port 94 configured to interface with a display to provide, for example, imagery of the depth of the body of water to an operator.

The computing device 66 may also include, or be coupled to, a low-power sonar apparatus 96 that is configured to generate a depth profile tensor.

Those skilled in the art will recognize improvements and modifications to the preferred embodiments of the disclosure. All such improvements and modifications are considered within the scope of the concepts disclosed herein and the claims that follow.

What is claimed is:

1. A method for generating a true depth profile of a body of water, comprising:
   accessing, by a computing device comprising a processor device, a depth profile tensor that identifies a depth at each of a plurality of locations of the body of water, the depth profile tensor identifying multiple depths for at least some locations of the plurality of locations, the depth profile tensor generated using low-power sonar signals having a power level at or below a power level of ambient noise in the body of water;
   converting, by the computing device, the depth profile tensor to a binary potential depth image that depicts multiple potential depths for the at least some locations;
   reducing, by the computing device, by a morphological filter process executing on the computing device, the multiple potential depths to a single depth for the at least some locations to generate a binary depth image; and
   converting, by the computing device, the binary depth image to the true depth profile.

2. The method of claim 1, further comprising flattening the depth profile tensor to a second-order depth profile tensor.

3. The method of claim 2, wherein flattening the depth profile tensor to the second-order depth profile tensor further comprises flattening the depth profile tensor to the second-order depth profile tensor such that a first dimension of the second-order depth profile tensor identifies a plurality of successive locations in the body of water, and a second dimension of the second-order depth profile tensor comprises one or more potential depths for each successive location of the plurality of successive locations.

4. The method of claim 1, wherein reducing, by the morphological filter process, the multiple potential depths to the single depth for the at least some locations to generate the binary depth image comprises:
   removing, by a coarse morphological filter process using a coarse structuring element, at least some of the multiple potential depths; and
   reducing, by a fine morphological filter process using a fine structuring element that differs from the coarse structuring element, at least some remaining multiple potential depths for the at least some locations.

5. The method of claim 4, further comprising:
   after reducing, by the fine morphological filter process using the fine structuring element, the at least some remaining multiple potential depths for the at least some locations, determining that at least one location comprises multiple potential depths; and
   applying a specialized structuring element to the at least one location to reduce the remaining multiple potential depths to a single potential depth.

6. The method of claim 5, wherein the specialized structuring element comprises a criterion selected from a group of: a shallowest depth of the remaining multiple potential depths, a deepest depth of the remaining multiple potential depths, and a depth that results in a smallest change in slope from depths identified in adjacent locations.

7. A computing device configured to generate a true depth profile of a body of water, comprising:
   a memory; and
   a processor coupled to the memory and configured to:

access a depth profile tensor that identifies a depth at each of a plurality of locations of the body of water, the depth profile tensor identifying multiple depths for at least some locations of the plurality of locations, the depth profile tensor generated using low-power sonar signals having a power level at or below a power level of ambient noise in the body of water;

convert the depth profile tensor to a binary potential depth image that depicts multiple potential depths for the at least some locations;

reduce, by a morphological filter process, the multiple potential depths to a single depth for the at least some locations to generate a binary depth image; and convert the binary depth image to the true depth profile; and store the true depth profile in a storage device.

8. The computing device of claim 7, wherein the processor is further configured to flatten the depth profile tensor to a second-order depth profile tensor.

9. The computing device of claim 8, wherein to flatten the depth profile tensor to the second-order depth profile tensor the processor is further configured to flatten the depth profile tensor to the second-order depth profile tensor such that a first dimension of the second-order depth profile tensor identifies a plurality of successive locations in the body of water, and a second dimension of the second-order depth profile tensor comprises one or more potential depths for each successive location of the plurality of successive locations.

10. The computing device of claim 7, wherein to reduce, by the morphological filter process, the multiple potential depths to the single depth for the at least some locations to generate the binary depth image, the processor is further configured to:

remove, by a coarse morphological filter process using a coarse structuring element, at least some of the multiple potential depths; and reduce, by a fine morphological filter process using a fine structuring element that differs from the coarse structuring element, at least some remaining multiple potential depths for the at least some locations.

11. The computing device of claim 10, wherein after reducing, by the fine morphological filter process using the fine structuring element, at least some remaining multiple potential depths for the at least some locations, the processor is further configured to:

determine that at least one location comprises multiple potential depths; and apply a specialized structuring element to the at least one location to reduce the remaining multiple potential depths to a single potential depth.

12. A computer program product for generating a true depth profile of a body of water, the computer program product stored on a non-transitory computer-readable storage medium and including instructions configured to cause a processor to:

access a depth profile tensor that identifies a depth at each of a plurality of locations of the body of water, the depth profile tensor identifying multiple depths for at least some locations of the plurality of locations, the depth profile tensor generated using low-power sonar signals having a power level at or below a power level of ambient noise in the body of water;

convert the depth profile tensor to a binary potential depth image that depicts multiple potential depths for the at least some locations;

reduce, by a morphological filter process, the multiple potential depths to a single depth for the at least some locations to generate a binary depth image; and convert the binary depth image to the true depth profile.

13. The computer program product of claim 12, wherein the instructions are further configured to cause the processor to flatten the depth profile tensor to a second-order depth profile tensor.

14. The computer program product of claim 13, wherein to flatten the depth profile tensor to the second-order depth profile tensor the instructions are further configured to cause the processor to flatten the depth profile tensor to the second-order depth profile tensor such that a first dimension of the second-order depth profile tensor identifies a plurality of successive locations in the body of water, and a second dimension of the second-order depth profile tensor comprises one or more potential depths for each successive location of the plurality of successive locations.

15. The computer program product of claim 12, wherein to reduce, by the morphological filter process, the multiple potential depths to the single depth for the at least some locations to generate the binary depth image, the instructions are further configured to cause the processor to:

remove, by a coarse morphological filter process using a coarse structuring element, at least some of the multiple potential depths; and reduce, by a fine morphological filter process using a fine structuring element that differs from the coarse structuring element, at least some remaining multiple potential depths for the at least some locations.

16. The computer program product of claim 15, wherein the instructions are further configured to cause the processor to:

after reducing, by the fine morphological filter process using the fine structuring element, the at least some remaining multiple potential depths for the at least some locations, determine that at least one location of the at least some locations comprises multiple potential depths; and apply a specialized structuring element to the at least one location to reduce the remaining multiple potential depths to a single potential depth.

17. The computer program product of claim 16, wherein the specialized structuring element comprises a criterion selected from a group of: a shallowest depth of the remaining multiple potential depths, a deepest depth of the remaining multiple potential depths, and a depth that results in a smallest change in slope from depths identified in adjacent locations.

* * * * *